Sept. 27, 1966
N. A. LEONE
3,274,774
RECIPROCATING PISTON ROTATING CYLINDER
BLOCK ROTARY ENGINE
Filed Sept. 11, 1964
5 Sheets-Sheet 1
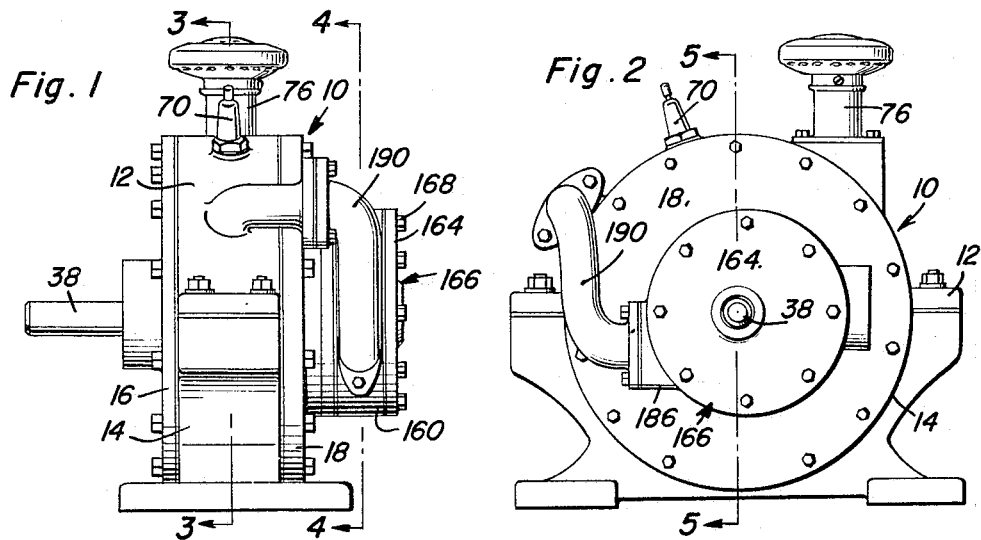
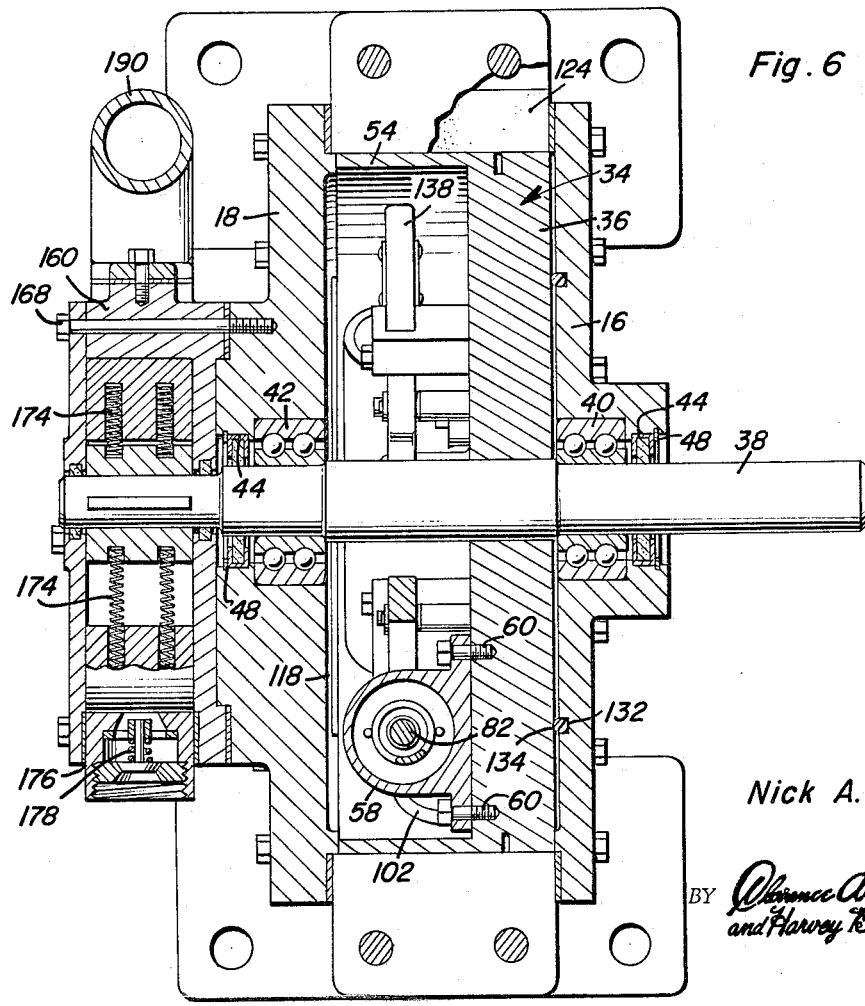
Nick A. Leone
INVENTOR.
BY Clarence A. O'Brien
and Harvey B. Jacobson
Attorneys Sept. 27, 1966  N. A. LEONE  3,274,774
RECIPROCATING PISTON ROTATING CYLINDER
BLOCK ROTARY ENGINE
Filed Sept. 11, 1964  5 Sheets-Sheet 2

Nick A. Leone
INVENTOR.

BY Clarence A. O'Brien
and Harvey B. Jackson
Attorneys

Sept. 27, 1966   N. A. LEONE   3,274,774
RECIPROCATING PISTON ROTATING CYLINDER
BLOCK ROTARY ENGINE
Filed Sept. 11, 1964   5 Sheets-Sheet 3

Nick A. Leone
*INVENTOR.*

Sept. 27, 1966

N. A. LEONE 3,274,774

RECIPROCATING PISTON ROTATING CYLINDER
BLOCK ROTARY ENGINE

Filed Sept. 11, 1964

Nick A. Leone
INVENTOR.

BY *Clarence A. O'Brien*
*and Harvey B. Jacobson*
Attorneys

Sept. 27, 1966  N. A. LEONE  3,274,774
RECIPROCATING PISTON ROTATING CYLINDER
BLOCK ROTARY ENGINE Filed Sept. 11, 1964  5 Sheets-Sheet 5

Nick A. Leone
INVENTOR.

BY Clarence A. O'Brien
and Harvey B. Jacobson
Attorneys

3,274,774
RECIPROCATING PISTON ROTATING CYLINDER BLOCK ROTARY ENGINE

Nick A. Leone, Lohrville, Wis., assignor of ten percent each to Albert C. Fell, Ann A. Fell, James F. Murray, and Betty J. Murray, Milwaukee, Wis.
Filed Sept. 11, 1964, Ser. No. 395,778
9 Claims. (Cl. 60—39.34)

This invention relates to a novel and useful rotary internal combustion engine and more specifically to an engine of the type including a housing or casing having a rotor journaled therein, the rotor including cylinder members mounted thereon and extending along circumferentially spaced chords of the rotor with pistons reciprocal in the cylinder members and yieldingly urged toward one set of corresponding ends thereof which open outwardly of the rotor and are communicated with the cavity in which the rotor is received. The housing or casing includes inlet and exhaust means spaced circumferentially thereabout and opening inwardly generally radially thereof and the rotor and casing include coacting means for intermittently withdrawing the pistons from the open ends of the cylinder members as they are sequentially registered with the fuel inlet means and then releasing the pistons for movement by spring pressure toward the open ends of the cylinder members as they are registered with fuel ignition means. After the compressed fuel and air mixture in each cylinder member is ignited, the rapid expansion of the gases therein forces that piston inwardly toward the inner position and against the spring pressure which normally yieldingly urges the piston outwardly as the cylinder member moves into registry with the exhaust port formed in the casing.

The rotary engine of the instant invention is particularly well adapted for manufacture in various sizes and any given size of engine may include one or more cylinder members and reciprocating pistons, the maximum number thereof only being limited to the space available on the rotor. In addition, although several modifications of coacting means for retracting the reciprocating pistons are illustrated and described hereinafter, it is to be understood that various other types of piston retracting means may be utilized.

The rotary engine of the instant invention may receive a fuel and air mixture from a conventional carburetor or the like inasmuch as inward movement of the pistons in the cylinder members before the latter are registered with the intake port creates a partial vacuum in the cylinder members. This partial vacuum will enable atmospheric pressure to cause the fuel and air mixture to be forced into the cylinder members as each cylinder member is registered with the intake port. However, the rotary engine is also particularly well adapted to receive the fuel and air mixture therefor under pressure from air pump means driven by the rotor carrying the cylinder members and corresponding pistons. Accordingly, the rotary engine may be provided with conventional air and fuel induction means or it may be readily modified so as to receive an air and fuel mixture under pressure.

The rotary engine of the instant invention is further provided with means whereby the angular displacement of the rotor relative to the intake port may be adjusted in relation to the positions of the rotor at which point the pisons begin their inward movement in preparation for the corresponding cylinder members to receive a combustible air and fuel mixture.

The main object of this invention is to provide a rotary engine of novel design that will be particularly well adapted for manufacture in various sizes and maximum power output capacities. In this manner, the rotary engine, with certain modifications, may be tailored for individual operations.

Another object of this invention, in accordance with the immediately preceding object, is to provide a rotary engine which may be readily manufactured in various sizes and power output capacities with many identical parts of the rotary engine being usable in different tailor-made forms without modifications thereto.

Yet another object of this invention is to provide a rotary engine in accordance with the preceding objects including a novel oiling system.

A final object of this invention to be specifically enumerated herein is to provide a rotary engine which will conform to conventional forms of manufacture, be of simple construction and dependable in operation so as to provide a device that will be economically feasible, long lasting and relatively troublefree.

FIGURE 1 is a side elevational view of the rotary engine of the instant invention;

FIGURE 2 is an end elevational view of the rotary engine as seen from the right side of FIGURE 1;

FIGURE 6 is a horizontal sectional view taken substantially upon the plane indicated by the section line 6—6 of FIGURE 5;

Figure 3:
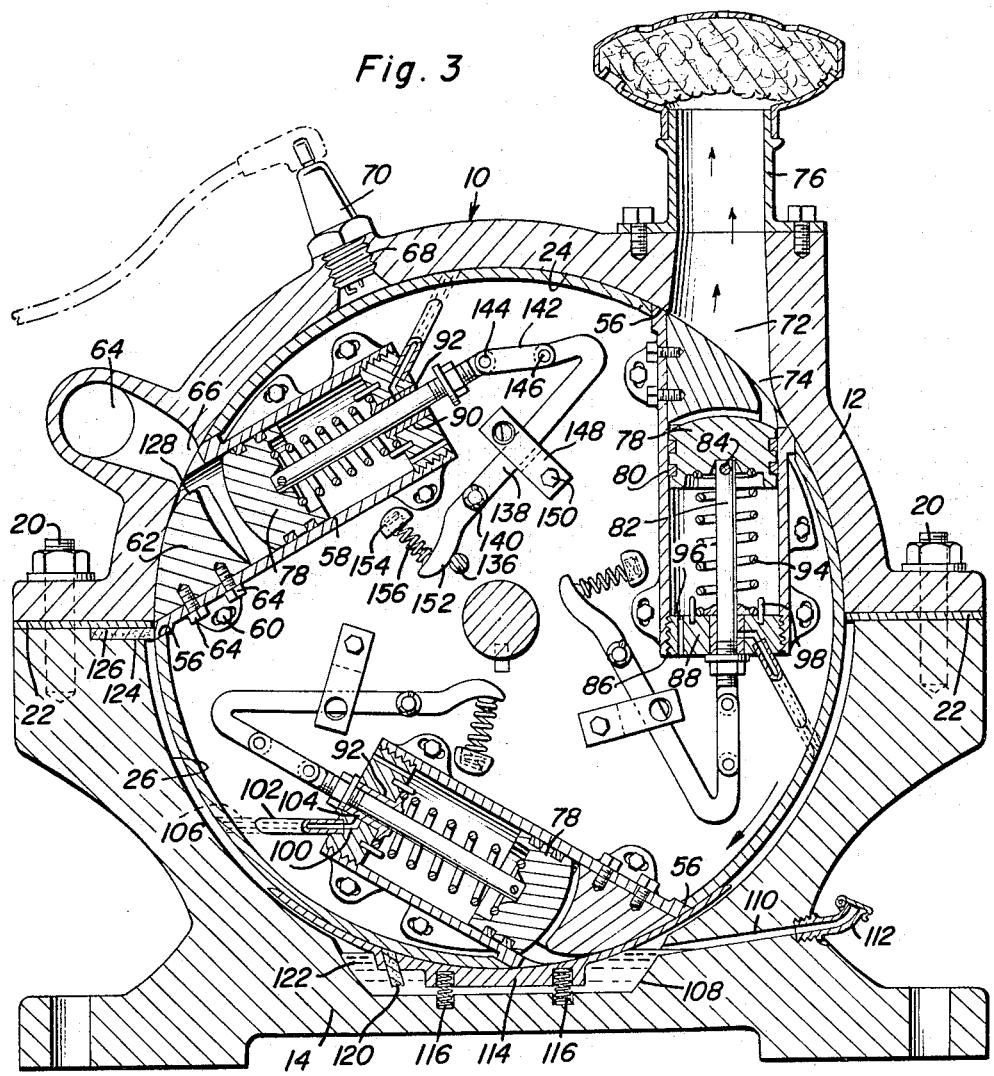
FIGURE 3 is an enlarged vertical sectional view taken substantially upon the plane indicated by the section line 3—3 of FIGURE 1.

With reference now more specifically to the drawings the numeral 10 generally designates the rotary engine of the instant invention which includes a pair of generally semi-cylindrical center casing halves 12 and 14 sandwiched between a pair of opposite end walls 16 and 18. The casing halves 12 and 14 are rigidly secured together by means of suitable fasteners 20 and have shim-type gaskets 22 disposed between the confronting surfaces thereof. The casing half 12 includes a semi-cylindrical recess 24 and the casing half 14 includes a semi-cylindrical recess 26 whose radius of curvature is slightly greater than the radius of curvature of the recess 24.

The opposite end walls 16 and 18 are secured to corresponding sides of the casing halves 12 and 14 by means of suitable fasteners 28 and 30.

The casing assembly defined by the casing halves 12 and 14 and the end walls 16 and 18 defines a generally cylindrical cavity 32 in which a rotor assembly generally referred to by the reference numeral 34 is received. The rotor assembly 34 includes a rotor disk 36 having a shaft 38 secured therethrough and the opposite end portions of the shaft 38 are rotatably journaled in suitable bearings 40 and 42 recessed in the end walls 16 and 18. The end walls 16 and 18 also include oil seals 44 and 46 which are removably retained in position by means of snap rings 48 and 50, respectively.

The disk 36 includes a laterally projecting and substantially cylindrical flange 54 which is snugly received within the recess 24 and the recess 26, there being very little clearance between the flange 54 and the walls of the recess 24 and only a slight bit greater clearance between the flange 54 and the walls of the recess 26.

The flange 54 has a plurality of generally radially outwardly opening notches 56 formed therein and spaced circumferentially thereabout and a plurality of cylinder members 58 are secured to the side of the disk 36 from which the flange 54 projects and include open end portions seated in the notches 56. The cylinder members 58 are secured to the disk 56 by means of suitable fasteners 60 and each of the cylinder members 58 has a combustion chamber reducing plug 62 secured therein by means of suitable fasteners 64.

The casing half 12 includes a fuel and air inlet passage 64 which opens into the recess 24 as to 66, a threaded opening 68 in which an ignition spark plug 70 is threadedly secured, and an exhaust passage 72 which opens inwardly of the recess 24 as at 74 and has a muffler construction 76 secured to its outlet end.

A piston 78 including a plurality of rings 80 is reciprocal in each of the cylinder members 58 and has one end of a connecting rod 82 pivotally secured thereto as at 84. The end of each of the cylinder members 58 remote from the plug 62 thereof is internally threaded as at 86 and has an end wall plug 88 threadedly engaged therein which is centrally apertured as at 90 and has a sleeve bushing 92 secured therein through which the end of the corresponding connecting rod 82 remote from its piston 78 projects.

A compression spring 94 is disposed about each of the connecting rods 82 between corresponding pistons 78 and the associated movable end wall or plug 88. Further, each plug or end wall 88 is provided with a pair of breather apertures 96 and a coil spring retainer 98 in which the adjacent end of the corresponding coil spring 94 is seated.

Each of the end walls 88 further includes an oil passage 100 whose inlet end has one end of an oil tube 102 secured therein and whose outlet end is registered with a transverse bore 104 formed in the corresponding sleeve 92. The inlet end of each of the tubes 92 passes through an adjacent portion of the disk 36 as at 106 and opens through the outer periphery of the disk 36.

The lower portion of the recess 26 is enlarged as at 108 to form an oil reservoir and an oil filling passage 110 is formed in the lower portion of the casing half 14 and is communicated with the reservoir 108 at its inner end and with an exteriorly exposed fill neck 112 at its outer end.

An arcuate shoe 114 is resiliently supported from the bottom of the reservoir 108 by means of compression springs 116 and closely embraces the lower peripheral portion of the disk 36. The shoe 114 includes an upstanding guard flange 118 which partially encloses the lower portion of the disk 36 and supports an oiling wick 120 which is in contact with the lubricating oil 122 in the reservoir 108 at one end and the outer periphery of the disk 36 and flange 54 at the other end. In addition, it may be seen that the casing half 14 is relieved as at 124 and that an oil wiper member 126 is secured in the relieved portion 124 and sandwiched between the confronting adjacent surfaces of the casing halves 12 and 14. The disk 36 rotates in a clockwise direction as viewed in FIGURE 3 of the drawings and accordingly it may be seen that the wick 120 will first apply oil to the outer periphery of the flange 54 and that the wiper 126 will then wipe the excess oil from those outer surfaces.

The plugs 62 are rounded as at 128 so that they will not catch on the wick 120 or the wiper 126 and while the outer surfaces of the disk 36 and flange 54 are oiled by the wick 120, the sleeves 92 are oiled by means of the tubes 102 and the oil passages 100. From FIGURE 3 of the drawings it may be seen that the cylinder members 58 are longitudinally shiftable relative to the disk 36 in order that their clearance with the inner surfaces of the recess 24 may be precisely adjusted.

The end wall 16 includes a circular groove 132 in which an annular seal 134 is disposed and the seal 134 bears against the confronting surface of the disk 36 and seals the combustion chambers in the outer ends of the cylinder members 58 from the bearing 40. Further, the end wall 18 has an inwardly projecting timing pin 136 secured thereto at one end and the free end of the timing pin 136 projects into the recess 24 and is consecutively engageable by the free ends of the levers 138 which are pivotally supported from the disk 36 by means of pivot pins 140 and which are connected to the extended end portions of the connecting rods 82 by means of connecting links 142 pivotally secured to the connecting rods 82 as at 144 and to the levers 138 as at 146. A plurality of guides 148 are secured to the disk 36 by means of suitable fasteners 150 and each of the guides is provided to ensure proper guided oscillation of the levers 138. The ends of the levers 138 remote from the pivot pins 146 are curved as at 152 for engagement with the timing pin 136 and the disk 36 includes a plurality of anchor abutments 154 in which corresponding ends of a plurality of compression springs 156 are secured, the free ends of the compression springs 156 bearing against the end portions of the levers 138 remote from the pivot pins 146.

The end wall 18 has a blower assembly mounted thereon including a generally cylindrical casing 160 and a pair of opposite end walls 162 and 164. The blower assembly is generally referred to by the reference numeral 166 and is secured to the end wall 18 by means of suitable fasteners 168 passing through the end walls 162 and 164 as well as the cylindrical casing 160.

The adjacent end of the shaft 38 projects through the end walls 162 and 164 and has a rotor 170 mounted thereon between the end walls 162 and 164 including radially slidable vanes 172 normally urged toward outward positions by means of compression springs 174, the cylindrical casing 160 being eccentrically disposed relative to the axis of rotation of the shaft 38 in the bearings 40 and 42. The casing 160 includes an inlet neck 176 in which a check valve assembly 178 is secured and to which the outlet end of a manifold pipe 180 is connected by means of suitable fasteners 182, the inlet end of the manifold-pipe 180 having a conventional carburetor 184 mounted thereon.

The cylindrical casing 160 also includes an outlet neck 186 having a check valve assembly 188 disposed therein and the inlet end of a second manifold pipe 190 is secured to the outlet neck 186 by means of suitable fasteners 192, the outlet end of the second manifold pipe 190 being secured to the inlet end of the intake passage 164 as at 194 by means of suitable fasteners 196.

It is believed that the operation of the rotary motor 10 will be apparent in that an air and fuel mixture from the carburetor 184 enters the blower assembly 166 and is discharged therefrom through the outlet neck 186 thereof and into the manifold pipe 190. Then, as the cylinder members 58 are registered with the intake passage 64, the combustible air and fuel mixture is forced thereinto. After the cylinder members 58 move out of registry with the intake passage 64, the corresponding levers 138 move out of engagement with the timing pin 136 and allow the springs 94 to urge the pistons 78 outwardly in their corresponding cylinder members 58. Then the cylinder members 58 are registered with the spark plug 70 and the air and fuel mixture in the cylinder members 58 is ignited whereupon the pistons 78 are urged against the thrust of the springs 94 inwardly until the tension of the spring 94 and the compression of air in the inner ends of the cylinder members 58 absorb a portion of the thrust of the expanding burning gases and also overcome the inertia of the pistons 78. Then, as the cylinder members 58 register with the exhaust passage 72, the pistons are returned to their outermost positions by springs 94, and the burned gases pass outwardly of the engine 10 through the muffler construction 76, acting as a jet tending to rotate the rotor by reaction.

Figure 7:
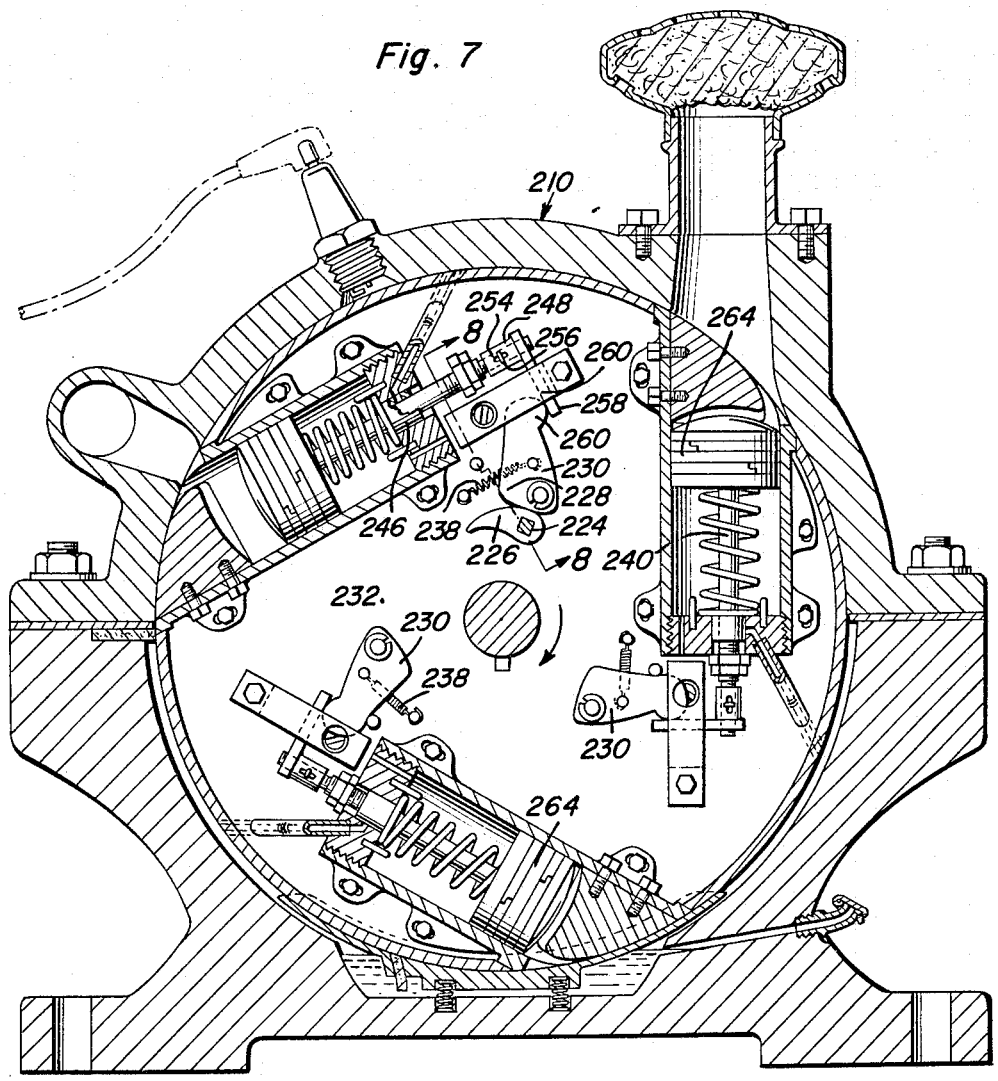
FIGURE 7 is a vertical sectional view similar to that of FIGURE 3 but showing a modified form of means for intermittently retracting the pistons.

With attention now invited more specifically to FIGURE 7 of the drawings there will be seen a modified form of engine generally referred to by the reference numeral 210. The engine 210 is substantially identical with the engine 10 expecting that the timing pin 212 thereof is mounted in an arcuate slot 214 formed through the end wall 216 corresponding to the end wall 18. The outer end of the slot 214 is enlarged as at 218 and it may be seen that the timing pin 212 is secured within the slot 214 by means of a suitable fastener 220.

The inner end of the timing pin 210 is provided with a non-circular blind bore 222 in which a non-circular shank 224 is seated, a cam shoe 226 being mounted on the extended end portion of the shank 224 for engagement with each of the heel portions 228 of the actuating levers 230 which are pivotally supported from the disk 232 corresponding to the disk 36.

The actuating levers 230 are each pivotally secured to the disk 232 by means of mounting pivot pins 236 and are yieldingly urged in a counterclockwise direction to a rest position by means of an expansion spring 238 secured between each of the actuating levers 230 and the disk 232.

Figure 11:
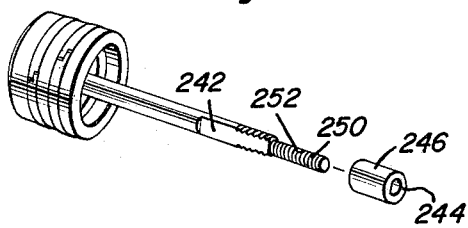
FIGURE 11 is a perspective view of one of the piston and connecting rod assemblies of the rotary engine.
Figure 4:
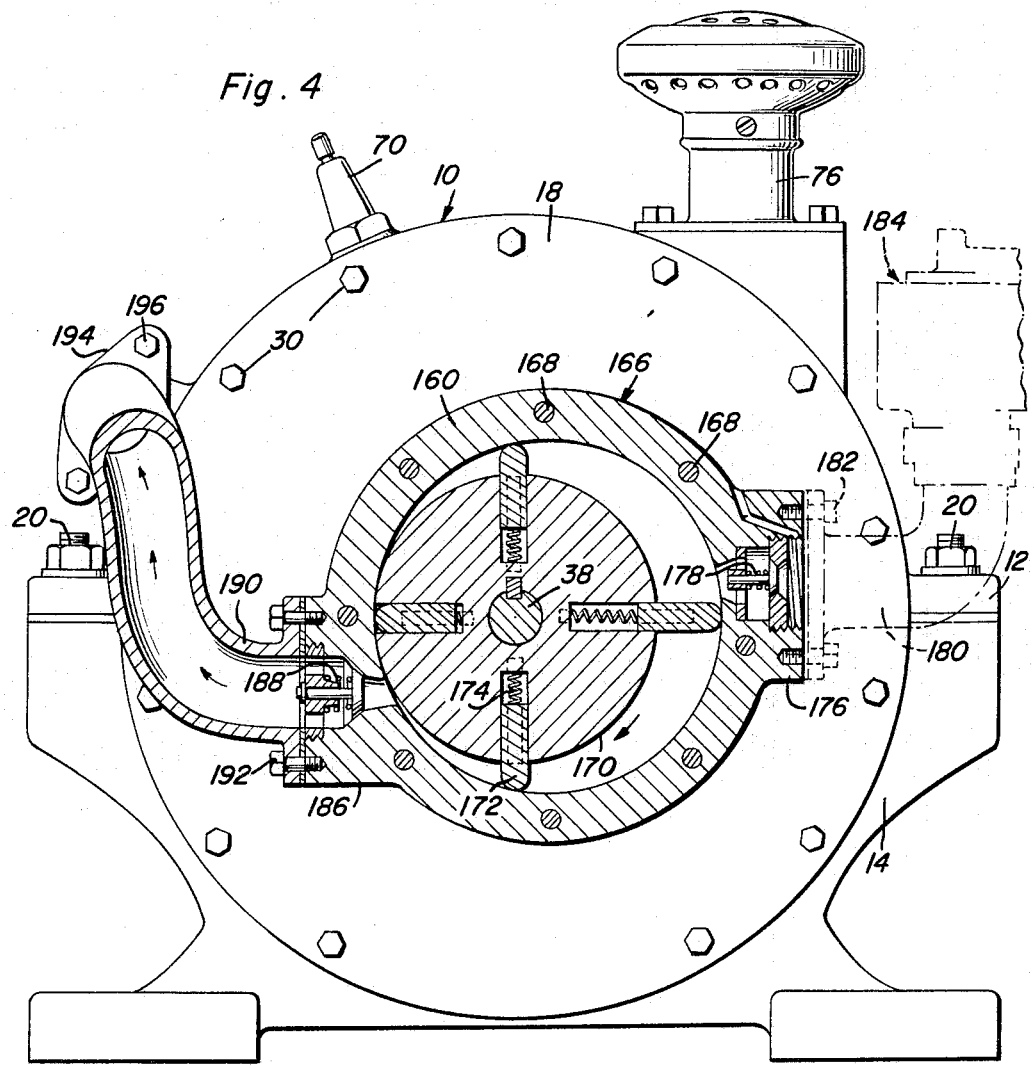
FIGURE 4 is an enlarged vertical sectional view taken substantially upon the plane indicated by the section line 4—4 of FIGURE 1.

The piston or connecting rods 240 of the engine 210 each include a flattened surface 242, see FIGURE 11, which coacts with a corresponding inner flat surface 244 of the corresponding sleeve 246, which sleeves 246 correspond to the sleeves 92. Accordingly, it may be seen that the piston or connecting rods 242 are prevented from rotating about their longitudinal axes. The connecting rods 240 have a sleeve member 248 threadedly engaged on their externally threaded and diametrically reduced end portions 250 and the diametrically reduced end portions 250 are provided with transverse bores 252 which are registrable with the longitudinal slots 254 formed in the sleeves 248. In this manner, the sleeves 248 may be locked to the diametrically reduced and externally threaded end portions 250 by means of suitable pins 256 secured through the slots 254 and the bores 252.

Each of the sleeves 248 includes a laterally directed arm portion 258 which is guidingly engaged by a guide 260 corresponding to the guides 148 and the toe portion 260 of the actuating levers 230 abuttingly engage the outer ends of the actuating arms 258. Accordingly, upon rotation of the disk 232 in a clockwise direction as viewed in FIGURE 7 of the drawings it may be seen that the heel portions 228 will engage the cam 226 so as to alternately oscillate the actuating levers 230, which oscillation will effect withdrawal of the pistons 264 corresponding to the pistons 78 in somewhat the same manner the timing pin 136 causes the pistons 78 to be retracted.

Figure 10:
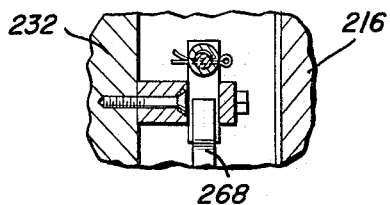
FIGURE 10 is an enlarged fragmentary sectional view taken substantially upon the plane indicated by the section line 10—10 of FIGURE 9.
Figure 5:
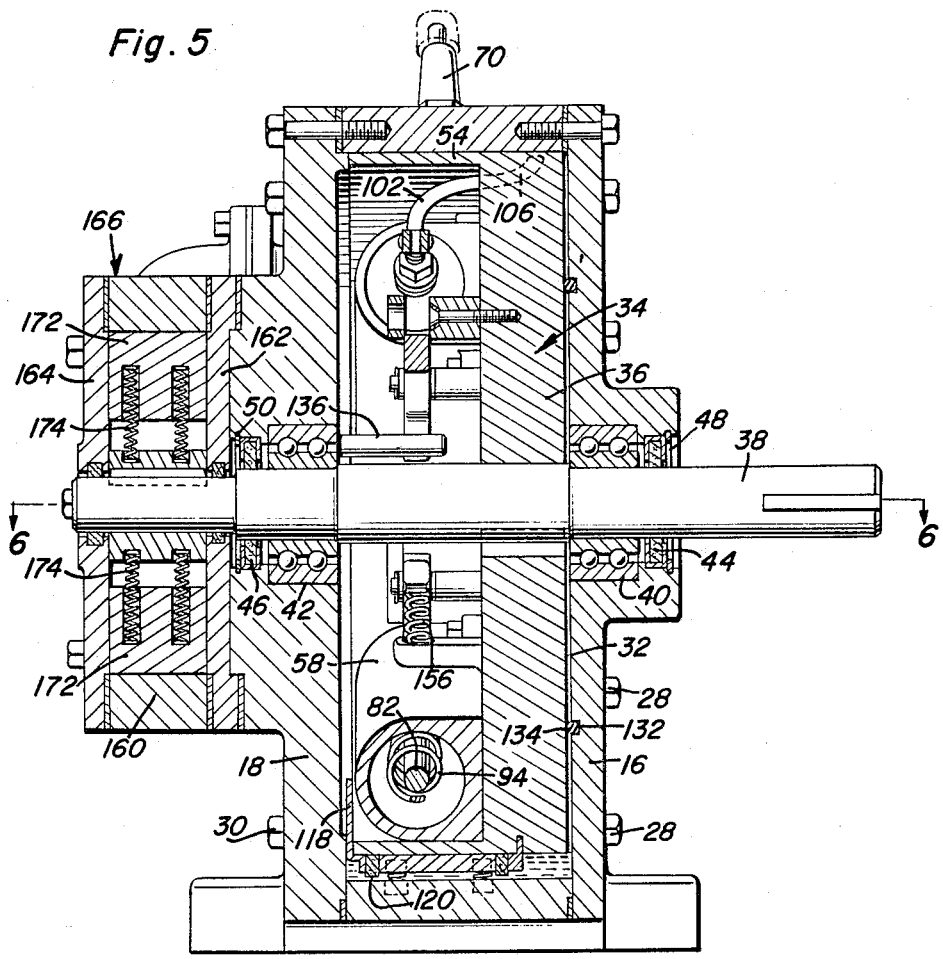
FIGURE 5 is an enlarged vertical sectional view taken substantially upon the plane indicated by the section line 5—5 of FIGURE 2.
Figure 9:
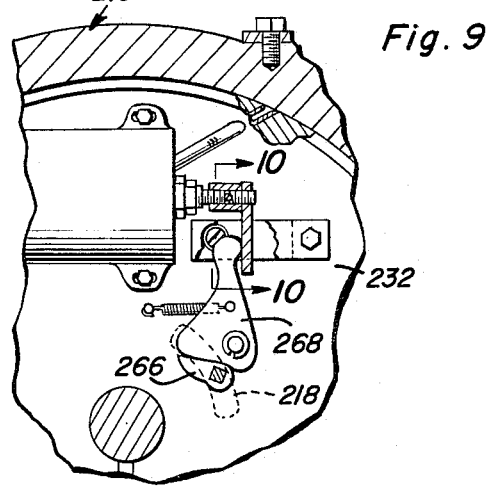
FIGURE 9 is a fragmentary sectional view illustrating a still further modified form of means for retracting the pistons.
Figure 8:
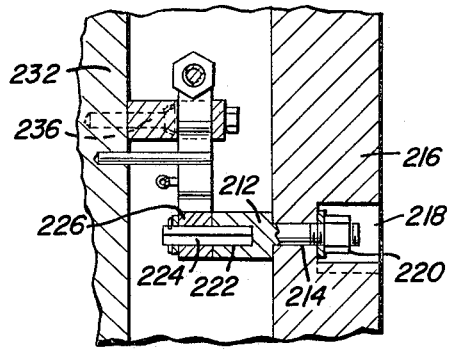
FIGURE 8 is an enlarged fragmentary sectional view taken substantially upon the plane indicated by the section line 8—8 of FIGURE 7.

With attention now directed more specifically to FIGURES 9 and 10, there may be seen a still further modified form of cam 226 and actuating lever 268 which may be utilized in lieu of the cam 226 and the actuating levers 230. Accordingly, it may be seen that the embodiment illustrated in FIGURES 9 and 10 is substantially identical to the embodiment 210 illustrated in FIGURES 7 and 8 the only real difference being that a cam 266 and a plurality of actuating levers 268 of different contours are utilized in lieu of the cam 226 and the actuating levers 230.

It is to be noted that the air pump or blower 166 may be utilized on any of the engines disclosed herein and also that each of the engines may be operated without use of the air pump 166 if the carburetor 184 is secured to the intake passage 64 at 194 in lieu of the pipe or conduit 190.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary cylinder reciprocating piston engine comprising a casing defining a generally cylindrical cavity, a rotor journaled in said cavity and substantially filling the latter, said rotor including a generally circular base disk and a cylindrical axially projecting outer peripheral wall projecting laterally of one side of said disk, said peripheral wall being snugly received in said cavity and having a plurality of circumferentially spaced openings formed therein, a plurality of cylinder members secured to said one side of said disk at points spaced circumferentially thereabout and extending generally along chords thereof with one set of corresponding open ends of said cylinder members defining ports sealed relative to the portions of said peripheral wall defining said openings, a piston reciprocable in each of said cylinder members, means operatively connected between said pistons and said cylinder members yieldingly urging said pistons toward said one set of ends and limiting movement of said pistons toward the other set of corresponding ends of said cylinder members, coacting means carried by said pistons and said casing operable to intermittently and sequentially move said pistons toward the other set of corresponding ends of said cylinder members and release said pistons for returning toward said one set of ends upon rotation of said rotor in said casing, air and fuel inlet means in said casing opening generally radially of said cavity at a point with which said ports are sequentially registered when said coacting means are moving the corresponding pistons toward said other set of ends, exhaust port means in said casing opening generally radially of said cavity at a point spaced circumferentially of said fuel inlet means and with which said ports are also sequentially registerable, and fuel ignition means communicated with said cavity at a point spaced circumferentially thereof between said inlet and exhaust port means and with which said ports are further registerable after their registry with said inlet means and before their registry with said exhaust port means in the direction of rotation of said rotor relative to said casing.

2. The combination of claim 1 including air pump means supported from said casing and driven by said rotor, said air pump means having an inlet and an outlet communicated with said air and fuel inlet means.

3. The combination of claim 1 wherein said air pump means is disposed exteriorly of said casing.

4. The combination of claim 1 including air pump means supported from said casing and driven by said rotor, said air pump means having an inlet and an outlet communicated with said air and fuel inlet means, said air pump means inlet and outlet each having check valve means operatively associated therewith preventing a reverse flow of air therethrough.

5. The combination of claim 1 wherein said cylinder members have a plurality of combustion chamber filler plugs secured in said one set of ends partially closing the latter, reducing the unoccupied portion of said one set of ends of said cylinder members when said pistons are disposed in their outermost positions, and forming a squelch area in each of said cylinder members for assisting checking outward movement of said pistons.

6. The combination of claim 1 wherein said rotor is journaled for rotation about a generally horizontal axis, said cavity including an enlarged lower portion defining an upwardly opening oil reservoir and oil wiper means disposed in said reservoir and slidably engaging the outer surface of said peripheral wall.

7. The combination of claim 6 wherein said casing circumferentially spaced from said reservoir and wiper in the direction of rotation of said rotor, includes second wiper means slidably engaging the outer surface of said peripheral wall and operable to wipe excess amounts of oil therefrom.

8. The combination of claim 7 wherein said air and fuel inlet means is circumferentially spaced from said second wiper means in the direction of rotation of said rotor.

9. The combination of claim 1 wherein said rotor is journaled for rotation about a generally horizontal axis, said cavity including an enlarged lower portion defining an upwardly opening oil reservoir and oil wiper means disposed in said reservoir and slidably engaging the outer surface of said peripheral wall, said wiper means including an upwardly opening arcuate guard embracing the lower portion of said rotor and operable to prevent said rotor from coming into direct contact with oil in said reservoir.

References Cited by the Examiner

UNITED STATES PATENTS 3,145,533    7/1962    Ollinger _____ 60—39.34

FOREIGN PATENTS 349,614    6/1931    Great Britain.

MARK NEWMAN, *Primary Examiner.*

SAMUEL LEVINE, *Examiner.*